Patented Aug. 16, 1932

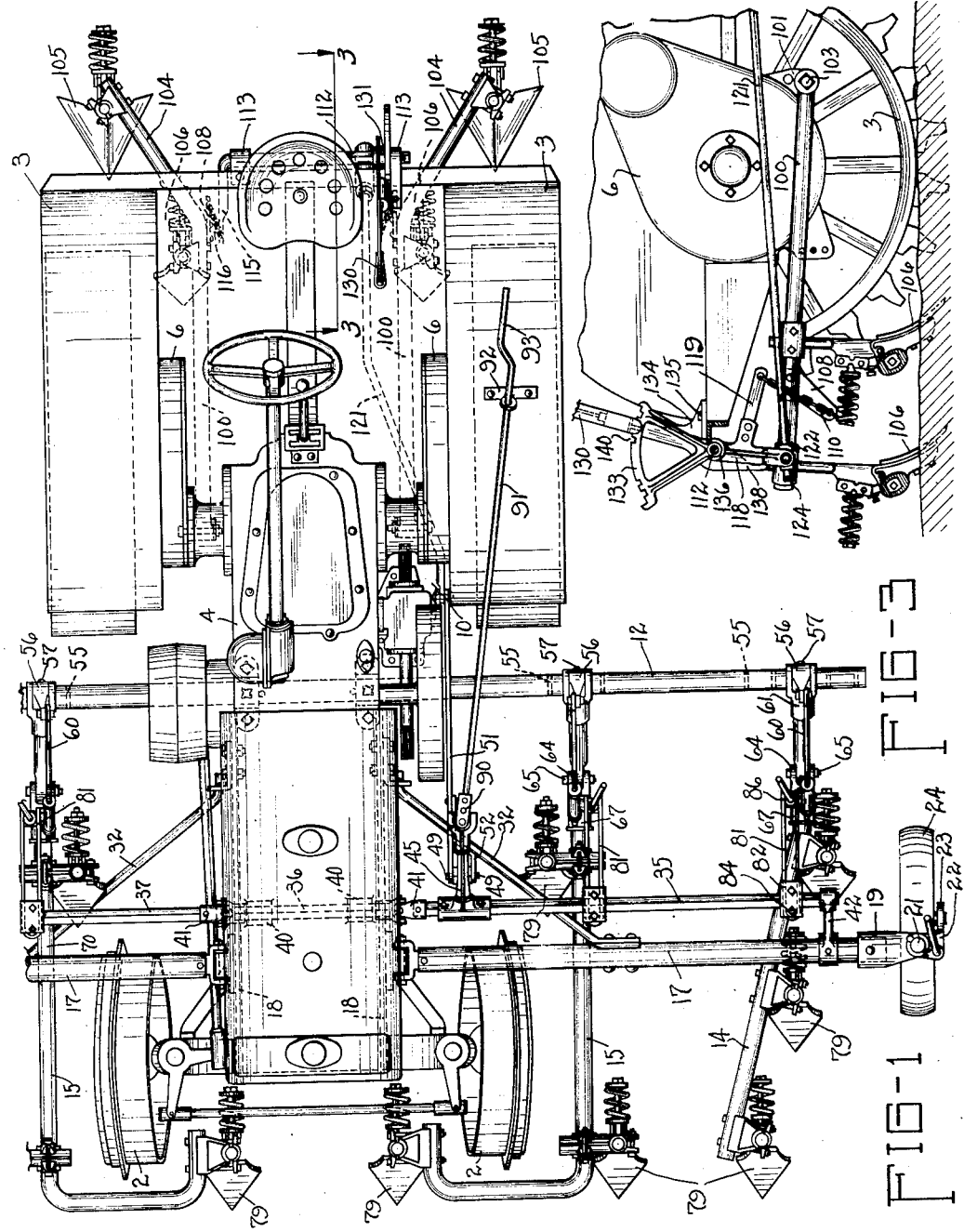

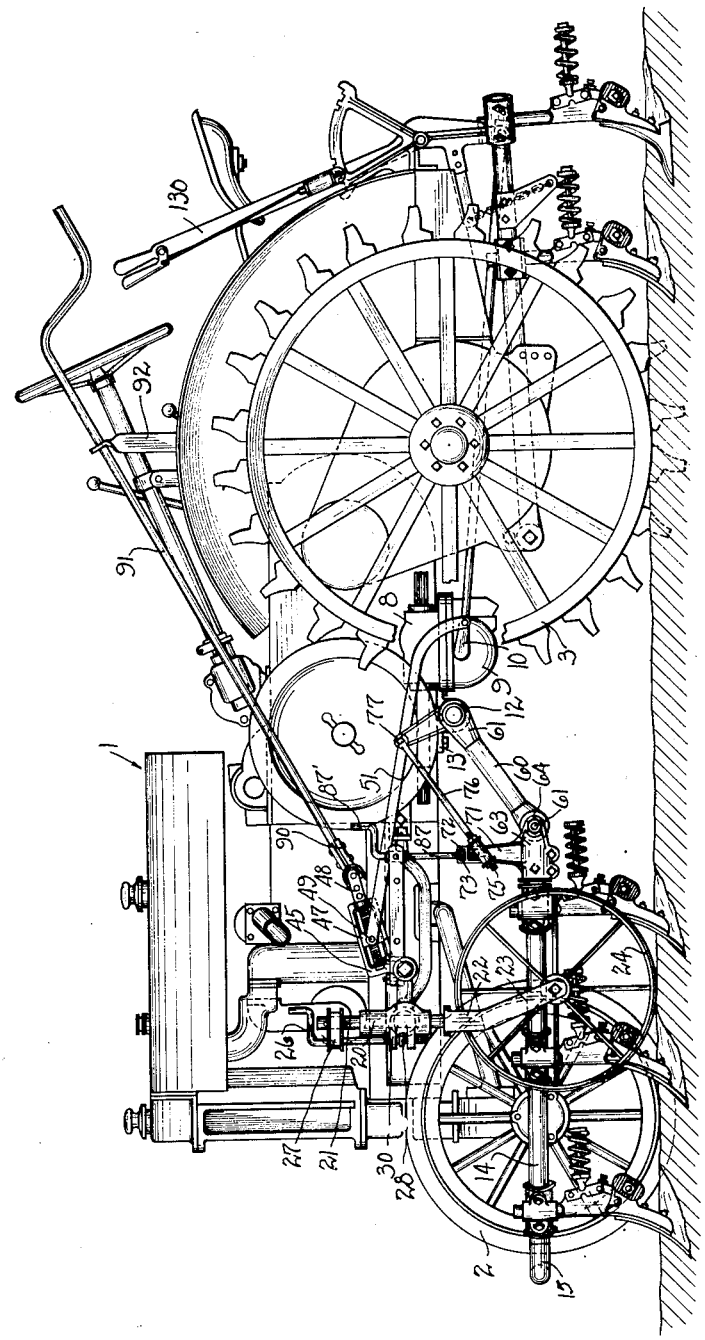

1,872,238

UNITED STATES PATENT OFFICE

THEOPHILUS BROWN, OF MOLINE, ILLINOIS, ASSIGNOR TO DEERE & COMPANY, OF MOLINE, ILLINOIS, A CORPORATION OF ILLINOIS

AGRICULTURAL IMPLEMENT

Application filed May 7, 1930. Serial No. 450,340.

My present invention relates generally to agricultural implements, and more particularly to implements wherein cultivating rigs are mounted on or are propelled directly by a tractor.

The principal object of my invention is to provide improved means for connecting the cultivator rigs to and supporting them from the tractor. Another object of my invention is to provide cultivator rigs both at the front and at the rear of a tractor, the cultivator rigs at the rear of the tractor having improved means for controlling their position relative to the tractor.

More specifically, my invention contemplates the provision of a cultivator frame for supporting the rigs and pivoted to the tractor, and a second cultivator frame acting to transmit the draft to the cultivator rigs and which is separate from the first mentioned cultivator frame and is adapted to be rigidly connected to the tractor. My invention also contemplates the provision of forwardly extending cultivator rigs which are connected to the draft frame at their rear ends and having soil tilling tools forward of the draft frame, whereby the rigs are pushed rather than pulled.

The chief advantage realized from the structure just mentioned is that a greater portion of the draft is transmitted through a rigid unitary member, yet the cultivator rigs are supported by flexible means so that they may follow the contour of the ground over which the implement is passing.

The principal object in mounting the cultivator rigs forwardly of the draft member is to secure a direct thrust transmitted to the rigs which makes for a steady running implement. Furthermore, by having the cultivator rigs extending forward the tools may be mounted adjacent the front wheels of the tractor so that the latter contact with the ground at about the same point as the cultivating tools, hence there is little relative movement between the tools and the front end of the tractor no matter how uneven the ground may be.

My invention also contemplates so mounting the rear cultivator rigs that they may be lifted either by the power lift on the tractor or by manually operated means at the rear of the tractor, the last mentioned means being adapted to act independently of the power lift connections. Thus, where it is not desired to cultivate the ground in the rear of a tractor it is a simple matter to swing the hand lever to elevate the rear cultivator rigs without in any way affecting the power lift connections.

Other objects and advantages of my invention will be apparent after a consideration of the following detailed description taken in conjunction with the accompanying drawings. For example, I propose to so form one or more of the cultivator rigs that the beam of each may lie on both sides of the front steering wheel or wheels of the tractor so as to thereby carry a soil tilling tool on either side of the steering wheels of the tractor. I also propose to connect the forwardly extending cultivator rigs with the draft frame member by means of a system of parallel links whereby the angular relation of the forwardly extending cultivator rigs with respect to the ground does not vary no matter how uneven the ground may be. Furthermore, I propose to support the flexible frame member from the ground surface by means of ground engaging members, and since these front cultivator rigs are supported from the flexible frame member it will be seen that my cultivator is adapted to maintain the soil tilling tools at a uniform operating depth at all times.

In the drawings:

Figure 1 is a top plan view of my improved implement, certain of the cultivating rigs on the right side of a tractor being omitted since these cultivator rigs are substantially identical with those shown on the left side of the tractor;

Figure 2 is a side elevation of the implement illustrated in Figure 1 and which shows all of the tools in soil tilling position; and Figure 3 is a fragmentary detailed view showing the power operating connection to the rear cultivating rigs and corresponds to a view taken substantially on the line 3—3 of Figure 1.

Referring now to the drawings, the reference numeral 1 indicates the tractor in its entirety having front wheels 2, rear drive wheels 3, and a transmission case and gear housing 4 which acts as a frame for the tractor. The rear drive wheels 3 may be driven by means of a sprocket and chain construction carried within drive housings 6, and the tractor is provided with a power take-off 8 and a power lift device 9, the latter comprising a power lift crank arm 10 operatively connected by means of a half revolution clutch to the tractor motor, as is well understood in the art. In power lift devices of this type the half revolution clutch is so arranged as to impart to the crank arm 10 a fore and aft swinging movement and to lock the same in either a forward or a rearward position.

A transverse draft member 12 in the form of a rigid pipe is fixedly secured to the frame 4 of the tractor by means of brackets 13 and this draft or frame member 12 is adapted to extend laterally on each side of the tractor so as to form outrigger supports for the reception of cultivator rigs 14 and 15 extending forwardly therefrom, there being a pair of cultivator rigs, such as the rigs 14 and 15, on each side of the tractor.

A second cultivator frame member is connected to the tractor 1, and from Figure 1 this member is seen to comprise a transversely extending outrigger bar or supporting member 17 pivoted to the tractor at either side thereof by means of brackets 18 for up and down swinging relatively thereto. The outer end of each of the bars 17 is provided with a casting 19 having a sleeve 20 in which is journaled the vertical spindle 21 of a ground engaging wheel support 22. The member 22 is provided with a rearwardly inclined wheel fork 23 having a wheel 24 journaled therein.

The wheel 24 and support 22 are adjustable relative to the casting 20 by virtue of a crank operated screw member 26 rotatably secured within a head 27 connected to move with the spindle 21 and a nut member 28 which is non-rotatably retained on the sleeve 20 by means of a pair of lugs 30, the screw 26 being threaded into the nut member 28 whereby rotation of the screw will effect a vertical adjustment of the spindle 21 relative to the sleeve 20 and the outer end of the supporting bar 17. Diagonal bracing members 32 are riveted or otherwise secured to the supporting bars 17 and extend to the tractor frame where they are pivotally secured to brackets 33 bolted to the frame.

Adjacent the supporting frame 17 is mounted a transverse rock shaft comprising three sections 35, 36 and 37, sections 35 and 37 extending laterally from the left and right sides of the tractor, respectively, and the section 36 being supported by means of bearing bosses 40 provided in the lower body portion of the tractor, which portion of the tractor is also provided with openings through which extends the intermediate rock shaft section 36. The sections 35 and 37 are respectively connected to the intermediate section 36 by means of universal joints 41, as best shown in Figure 1. The outer ends of the rock shaft sections 35 and 37 are each supported by means of an arm 42 fixedly mounted near the outer end of each of the supporting frame members 17.

As best shown in Figure 1, the rock shaft section 35 is provided with a rearwardly extending arm 45, the outer end of which arm comprises a slotted member having a nut 47 slidable therein. A screw 48 is journaled for rotation in the arm 45 and is threaded into the nut member 47 in such a manner that the position of the nut 47 in the slot of the arm 45 is determined and controlled by the screw 48. The nut 47 is provided with laterally extending pins or studs 49 whereby the nut is swiveled to a connecting link 51 extending therefrom to the crank arm 10, as best shown in Figure 2. The forward end of the link member 51 is provided with a strap 52 riveted thereto and cooperating therewith to provide the swivel connection with the nut 47.

Each of the cultivator rigs 14 and 15 is connected with the transverse rigid draft bar and the pivoted supporting bars which are connected to the tractor in advance of the draft bar. As best shown in Figure 1, the draft bar 12 is a single rigid pipe and at spaced points along said pipe there are provided a number of holes 55 providing for optional attachment of the upstanding arms 56 thereto. Bolts 57 may be utilized in securing the arms 56 to the draft member 12. The additional holes 55 in the draft bar 12 afford means for adjusting the transverse position of the arms 56 along the pipe 12 for accommodating different row spacings.

The cultivator rigs 14 and 15 are connected to the transverse draft bar or frame 12 by means of a parallel link system which will now be described. A compression member or strut 60 is connected at its upper and rearward end to the draft bar 12 by means of a socket 61 having a bifurcated end pivoted on the bar 12 for up and down swinging and embracing the arm 56 whereby its position transversely along the bar 12 is determined by the arm 56. The lower end of the compression member 60 is pivoted to a casting 63 having lugs 64 and a pivot bolt 65 passed therethrough and through the lower end of the compression member 60. The casting 63 also includes a forwardly extending socket 67 in which is bolted or otherwise secured the rear end of the cultivator beam 70. In addition, there is also provided on the casting 63 an upstanding arm 71 which has a slotted opening 72 for the reception of an adjusting nut 73 and a pivoted sleeve 75 in which is adjustably secured the lower end of a link 76, as best shown in Figure 2. The upper and rearward end of the link 76 is pivoted by means of a pivot bolt 77 to the upper end of the arm 56. It will be noted from Figure 1 that the distance from the axis of the draft bar 12 to the axis of the pivot bolt 77 is substantially equal to the distance between the pivot bolt 65 and the pivotal axis of the sleeve 75. Thus, the link 76 is at all times parallel to the compression member 60 and since the draft beam 70 is rigidly secured to the casting 63 the cultivator rig is adapted to occupy successive positions parallel to itself as it is moved or swung about the draft bar 12.

Each of the cultivator rigs 14 and 15 is connected to the draft bar 12 in a similar manner and it is believed unnecessary to specifically describe each of these connections. Soil tilling tools 79 are connected at various points along the draft beams 70 in any desired manner.

The cultivator rigs 14 and 15 are raised and lowered by the rocking of the rock shaft 35—37 through a connection comprising a rearwardly extending arm 81 in the form of a double strap secured to the rock shaft by means of a bolted casting 82, as best shown in Figure 1, the bolted connection between the casting 82 and the rock shaft being attained by virtue of a U-bolt 84 which may be loosened to shift the position of the arms 81 to any desired point along the rock shaft.

The rear end of each of the arms 81 receives a trunnion 86 in which is rotatably secured a crank screw 87 the lower end of which is adapted to be threaded into the nut 73 carried at the upper end of the upstanding arm 71. Thus, when the rock shaft is rocked in a counterclockwise direction as viewed in Figure 2 the arm 81 exerts a lifting effort upon the casting 63 which thereby raises the cultivator rigs secured thereto. The rock shaft is actuated by virtue of the link connection 51 to the lifting crank arm 10. Each of the cultivator rigs 14 and 15 is connected to the rock shaft in the same manner as just described, so that when the rock shaft is actuated all of the front rigs are lifted in unison. The position of each individual cultivator rig may, however, be adjusted by rotating in one direction or the other the crank 87' at the upper end of the crank screw 87, as best shown in Figure 2.

The vertical position of all of the cultivator rigs 14 and 15 may be simultaneously adjusted by means which will now be described. A universal joint 90 is secured to the rear end of the screw 48 and to the front end of a fore and aft extending rotatable rod 91, the rear end of which is slidably and rotatably received in an upstanding bracket 92 secured to the tractor 1 at a point near the rear thereof. The rod 91 is provided with a hand crank portion 93 which is positioned so as to be within easy reach of the operator. Referring now to Figure 2, it will be observed that as the rod 91 is rotated the nut 47 will be caused to take various positions lengthwise of the slot in the arm 45 whereby the lever arm or distance between the axis of the rock shaft and the axis of the pins 49 is varied. Since the power lift clutch effectively locks the power lift crank arm 10 in position it is obvious that as the rod 91 is rotated the angular position of the rock shaft will be varied, the variations being transmitted through each of the arms 81 to each individual cultivator rig whereby all are simultaneously adjusted to control their operating depth. When the front cultivator rigs are raised and lowered the rod 91 merely slides back and forth in the bracket 92.

It will be noted from Figure 1 that the two inner cultivator rigs 15 have the cultivator beams 70 thereof extending forwardly of the steering wheels 2 of the tractor and bent inwardly and then rearwardly so that portions of each cultivator beam 70 of the inner cultivator rigs 15 extend so as to lie on both sides of each of the steering wheels 2. Thus, in effect, the inner cultivator rigs have portions embracing the front wheels 2 of the tractor whereby soil tilling tools 79 are supported by each of the cultivator rigs on opposite sides of the front steering wheels of the tractor.

Cultivator rigs are also pivotally supported at the rear of a tractor 1, and these rigs may take the form of cultivator beams 100 pivotally connected at their forward ends to lugs 101 on the drive housings 6 by means of pivot bolts 103. Each of the cultivator beams 100 is formed with a back portion 104 arranged in diverging relation so as to bring a portion thereof substantially directly behind the drive wheels 3. Secured to the back portion 104 of each of the cultivator beams 100 is a soil tilling tool 105 which is preferably adapted to loosen up the soil which may be packed by the drive wheels 3. If desired, other soil tilling tools 106 may be attached to the cultivator beams 100, one way of attaching the same being shown in dotted lines in Figure 1.

Secured to each of the cultivator beams 100 is a bracket member 108 which serves as means for attaching the lifting chain 110 to the beam 100. A rock shaft 112 is journaled in brackets 113 secured to the rear portion of the tractor, one end of the rock shaft 112 being formed with an integral forwardly extending arm 115 which is connected by means of a chain 116 to the cultivator beam 100 on that side of the tractor, as best shown in Figure 1. At its left end the rock shaft 112 has secured thereto a downwardly extending arm 118 having a forward extension 119 which is connected by means of the chain 110 to the bracket 108, as best shown in Figure 3.

Thus when the rock shaft 112 is rocked in a counterclockwise direction as viewed in Figure 3 the cultivator beams 100 are swung upwardly about their pivotal axis at 103 by virtue of their chain connection with the lifting arms 115 and 119.

The rock shaft 112 is adapted to be rocked so as to lift the rear cultivator rigs at the same time that the front cultivator rigs are raised, and the connections for this purpose are seen to include a link 121 connected at its front end to the power lift crank arm 10 and at its rear end the link 121 is slidably received within a sleeve member 122 swiveled at the lower end of the arm 118. An abutment in the form of a pin 124 is provided at the rear end of the link 121 so that as the link 121 is drawn forward by the swinging of the power lift crank arm 10 the pin 124 contacts with the sleeve 122 and thereby rocks the shaft 112 and lifts the rear cultivator rigs.

The rear cultivator rigs may also be raised independently of the power lift connections, and for this purpose I provide the hand lever 130 secured to a journaled casting 131 having bearing support on the rock shaft 112, as best shown in Figure 1. The hand lever 130 is in operative association with the usual segment 133 which is provided with a forward extension 134 for attachment to the tractor, as by bolt 135, and the segment 133 is also formed with a bearing boss 136 which cooperates with the brackets 113 in rotatably supporting the rock shaft 112 on the tractor. The journal casting 131 is provided with an extension arm 138 which, in effect, forms an extension of the hand lever 130 and which is adapted to contact with a portion of the arm 118 fixedly secured to the rock shaft 112. Thus, when the hand lever 130 is rocked rearwardly from the position shown in Figure 3 the arm 138 contacts with the arm 118 to swing the rock shaft 112 in a counterclockwise direction, the sleeve 122 merely sliding forward of the link 121. The rotation of the rock shaft 112 is effective, as has been explained above, to raise the rear cultivator rigs so that the soil tilling tools 106 may be held out of engagement with the ground, or their position in the ground controlled.

This structure is of particular value where it is desired to operate the tractor using only the front cultivator rigs. By virtue of this construction the hand lever 130 may be used to raise the rear cultivator rigs so that it is not necessary to remove the rear cultivator rigs when it is desired to operate with the front cultivator rigs only, as just stated, the power lift connections being effective to raise and lower the front cultivator rigs as the occasion may demand without being affected in any way by the raised position of the rear cultivator rigs or without affecting the raised rear rigs. To use the rear rigs and to place them into operative association with the front rigs all that it is necessary to do is to rock the hand lever 130 to the forward position shown in Figure 3. It will be noted that the forward portion of the segment 133 is provided with several notches 140 which are for the purpose of positioning the lever 130 for a plurality of depth adjustments.

It will be understood, of course, that if the hand lever 130 is left in the position illustrated in Figure 3, the operation of the power lift connections to elevate the front cultivator rigs will also simultaneously lift the rear cultivator rigs, swinging the former forwardly and upwardly and swinging the latter upwardly about their pivotal axis at 103.

While I have described in connection with the accompanying drawings one preferred embodiment of my invention, it will be understood that my invention is not to be limited to the specific structure shown and described, but that, in fact, widely different means may be employed in the practice of the broader aspects of my invention.

What I claim, therefore, and desire to secure by Letters Patent is:

1. An agricultural implement comprising the combination with a tractor including front and rear wheels, of a transverse draft member, connected to the tractor, soil engaging devices connected to the draft member, and supporting means for said devices including a transverse bar secured to the tractor forward of said member and connected to the soil engaging devices.

2. An agricultural implement comprising the combination with a tractor including front and rear wheels, of a transverse draft member connected to the tractor, soil engaging devices connected to the draft member, and supporting means for said devices including a transverse bar secured to the tractor forward of said member, a rock shaft journaled on the bar, connections between the soil engaging devices and the rock shaft whereby rotation of the latter will raise said devices, and means to rock said shaft.

3. An agricultural implement comprising the combination with a tractor including front and rear wheels, of a transverse draft member connected to the tractor intermediate said front and rear wheels, soil engaging devices connected to the draft member, and supporting means for said devices including a transverse bar secured to the tractor forward of said member and means on the bar operative to control the position of said devices.

4. An agricultural implement comprising the combination with a tractor including front and rear wheels, of a transverse draft member connected to the tractor intermediate said wheels, soil engaging devices connected at their rear ends to the draft member, and means forward of the draft member and connected with the tractor for controlling the position of said soil engaging devices.

5. An agricultural implement comprising the combination with a tractor including front and rear wheels, of a transverse draft member connected to the tractor intermediate said wheels, soil engaging devices connected at their rear ends to the draft member, soil engaging devices at the rear of the tractor, and means forward of the draft member and connected with the tractor for controlling the position of said soil engaging devices.

6. An agricultural implement comprising the combination with a tractor including a motor, of a laterally extending draft beam, soil engaging devices connected with the beam, wheel supported means for supporting said devices and connected to the tractor forward of the draft beam, and power lift mechanism associated with the wheel supported means and adapted to be actuated by said motor to elevate the devices to transport position.

7. An agricultural implement comprising the combination with a tractor including a motor, of a laterally extending draft beam, soil engaging devices connected with the beam, other soil engaging devices connected with the tractor, wheel supported means connected with the tractor forward of the draft beam for supporting the first named soil engaging devices, and connections associated with said means and with said second named devices for raising all of said soil engaging devices.

8. An agricultural implement comprising the combination with a tractor including a motor, of a laterally extending draft beam, soil engaging devices connected with the beam, means to adjust the operating depth of said devices, wheel supported means for supporting said devices and connected to the tractor forward of the draft beam, and power lift mechanism associated with the wheel supported means and adapted to be actuated by said motor to elevate the devices to transport position.

9. An agricultural implement comprising the combination with a tractor having a motor, of a laterally extending draft beam, a plurality of soil engaging rigs connected at their rear ends with the beam and extending forwardly therefrom, and means actuated by the motor for controlling the position of said devices.

10. An agricultural implement of the class described, comprising the combination with a tractor having a motor, of a transverse draft member secured to the tractor, a cultivator rig including a forwardly extending bar connected near its rear end to the member and carrying an earth working tool forward of the member, and power lift mechanism adapted to be actuated by the motor for raising the tool from its earth working position.

11. A cultivator comprising a wheeled frame, a laterally extending rigid draft member, cultivator beams pivoted thereto and extending forwardly thereof, soil tilling tools connected to the beams forwardly of the member, and means including a member pivoted to the frame for controlling the vertical position of the beams.

12. A cultivator comprising a wheeled frame, a laterally extending rigid draft member, cultivator beams pivoted thereto and extending forwardly thereof, soil tilling tools connected to the beams forwardly of the member, a laterally extending supporting member having bracket means and pivoted to the frame, a rock shaft journaled in the frame and in the bracket means, link means connecting the rock shaft and beam whereby the tools may be elevated by rocking the shaft, and means on the frame to actuate the rock shaft.

13. A cultivator comprising a wheeled frame, a laterally extending rigid draft member, cultivator beams pivoted thereto and extending forwardly thereof, soil tilling tools connected to the beams forwardly of the member, a laterally extending supporting member having bracket means and pivoted to the frame, a rock shaft journaled in the frame and in the bracket means, link means connecting the rock shaft and the beams whereby the tools may be elevated by rocking the shaft, cultivator beams and soil tilling tools at the rear of the frame, and means on the frame to lift the rear cultivator beams and actuate the rock shaft to lift the first mentioned cultivator beams and tools.

14. A cultivator comprising a wheeled frame, a laterally extending rigid draft member, cultivator beams pivoted thereto and extending forwardly thereof, soil tilling tools connected to the beams forwardly of the member, and means flexible with respect to the wheeled frame for controlling the position of the beams.

15. An agricultural implement comprising the combination with a tractor having a motor, a rigid laterally extending draft bar connected to the tractor intermediate the ends thereof, a plurality of cultivator rigs pivoted to said draft bar, and flexible means connected to the tractor forward of the draft bar for supporting the cultivator rigs.

16. An agricultural implement comprising the combination of a frame having supporting and steering wheels, a transverse draft beam carried by the frame, cultivator beams having soil engaging tools and journaled on the draft beams for movement in a vertical plane, one of said beams extending on both sides of one of the steering wheels, said cultivator beams extending forwardly of the draft beam.

17. An agricultural implement comprising the combination of a frame having supporting and steering wheels, a transverse draft beam carried by the frame, cultivator beams having soil engaging tools and journaled on the draft beam on either side of the frame for swinging movement relative thereto, the inner of said cultivator beams each including a part formed to lie on both sides of the corresponding steering wheel whereby to position soil engaging tools on both sides of the steering wheels, and means on the frame to raise the cultivator beams, said cultivator beams extending forwardly of the draft beam.

18. An agricultural implement comprising the combination with a tractor having driving and steering wheels and a motor, of supporting bars connected to extend transversely of the tractor and on either side thereof, cultivator beams connected to the bars and extending forwardly thereof, soil tilling tools carried at the forward end of the beams, certain of said beams being bent so as to embrace a steering wheel thereby supporting a soil tilling tool on each side of the steering wheel, and lift mechanism adapted to be actuated from the motor for lifting the cultivator beams.

19. A cultivator comprising a frame including a tranverse bar, a plurality of rigs pivoted to the bar and extending forwardly therefrom, and means to pivot the rigs to the bar including a member adapted to be connected with the bar in any one of a number of selected positions.

20. A cultivator comprising a frame including a transverse bar, a plurality of rigs extending forwardly therefrom, and means to pivot the rigs to the bar including a member adapted to be connected with the bar in any one of a number of selected positions and a link pivoted to the member and to the rig.

21. A cultivator comprising a frame including a transverse bar, a plurality of rigs extending forwardly therefrom, means to pivot the rigs to the bar including a member adapted to be connected with the bar in any one of a number of selected positions and a link pivoted to the member and to the rig, and means to simultaneously raise all of the cultivator rigs.

22. An agricultural implement comprising the combination with a tractor including a motor, of an attachment comprising a draft member extending laterally from the tractor, a supporting member also extending laterally from the tractor and connected to swing vertically about a longitudinal axis, ground engaging means supporting said last named member and connected to swing therewith, a rig connected with said draft member to swing vertically about a transverse axis, and power lift mechanism connected with the rig including a part carried by the supporting member and adapted to be actuated by the motor to swing the rig vertically.

23. An agricultural implement comprising the combination with a tractor having a motor, a rigid laterally extending draft bar connected to the tractor, a cultivator rig connected to the draft bar to swing vertically about a transverse axis, a supporting member extending tranversely of the tractor flexibly connected thereto and adapted to support the rig, and power operated connections between the member and the rig adapted to be actuated by the motor to raise the rig relative to the supporting member.

24. An agricultural implement comprising the combination with a tractor having a motor, a rigid laterally extending draft bar connected to the tractor, a cultivator rig, means including a system of parallel links connecting the rig to the draft bar to swing vertically about a transverse axis in successive parallel positions, a supporting member extending transversely of the tractor flexibly connected thereto and adapted to support the rig, and power operated connections between the member and the rig adapted to be actuated by the motor to raise the rig relative to the supporting member.

25. An agricultural implement comprising the combination with a tractor including a motor, of an attachment comprising a draft member extending laterally from the tractor, a supporting member also extending laterally from the tractor and connected to swing vertically about a longitudinal axis, ground engaging means supporting said last named member and connected to swing therewith, a rig connected with said draft member to swing vertically about a transverse axis, power lift mechanism connected with said rig inclnding a part carried by the supporting member and adapted to be actuated by the motor to swing the rig vertically, and means to adjust the position of the supporting member on the ground engaging means.

26. A cultivator comprising, in combination, a wheeled frame, a cultivator frame comprising a rigid draft member secured transversely to the wheeled frame and a non-rigid member pivoted to the wheeled frame, ground engaging supports connected with the non-rigid member, and cultivator rigs pivoted to the rigid member and supported from the non-rigid member.

27. A cultivator comprising, in combination, a wheeled frame, a cultivator frame comprising a rigid draft member secured transversely to the wheeled frame and a non-rigid member pivoted to the wheeled frame, ground engaging supports connected with the non-rigid member, and cultivator rigs pivoted to the rigid member and extending forwardly therefrom, soil tilling tools carried by the rigs in advance of their pivotal connection with the rigid draft member, and supporting connections between the non-rigid member and the rigs.

28. A cultivator comprising, in combination, a wheeled frame, a cultivator frame comprising a rigid draft member secured transversely to the wheeled frame and a non-rigid member pivoted to the wheeled frame, ground engaging supports connected with the non-rigid member, and cultivator rigs pivoted to the rigid member to swing about a transverse axis in a manner so as to occupy parallel positions, said rigs being transversely arranged with respect to the draft member and extending forwardly therefrom, soil tilling tools carried by the rigs in advance of their pivotal connection with the rigid draft member, and supporting connections between the non-rigid member and the rigs.

29. A cultivator comprising, in combination, a wheeled frame, a cultivator frame comprising a rigid draft member secured transversely to the wheeled frame and a non-rigid member pivoted to the wheeled frame, cultivator rigs swingably connected with the draft member, and lifting means associated with the non-rigid member for raising and lowering the cultivator rigs.

30. In an agricultural implement, the combination with a tractor including a motor, of implement means mounted at the front and rear ends of the tractor and comprising devices adapted to be raised and lowered in the operation of the implement, a power lift crank mounted on the side of the tractor and deriving power from the motor thereof, operating connections extending from said crank to the front and rear devices of said implement means, and manually operated lifting means operable to raise the rear implement means independently of the power operated connections and lock said rear implement means in raised position.

31. In an agricultural implement, the combination with a tractor including ground engaging traction elements and a motor for driving the same, of an attachment comprising rigid outrigger means mounted on the tractor, a series of front cultivating rigs extending forwardly from and connected with said outrigger means to swing toward or from the ground, and rear cultivating rigs mounted on the rear portion of the tractor.

32. In an agricultural implement, the combination with a tractor including a motor, of outrigger frames connected to the tractor, one of said frames being pivotally connected to the tractor whereby said frame can rise and fall relatively to the tractor, the other of said frames being rigidly connected to the tractor, front cultivating rigs connected with the rigid frame to swing toward or from the ground, a front rock shaft journaled on the first named frame and operatively connected with said front rigs to raise and lower the latter, a rear set of cultivating rigs connected with the rear portion of the tractor to swing toward or from the ground, a rear rock shaft operatively connected with said latter rigs to raise and lower the same, a power take-off device on the tractor capable of deriving power from the motor thereof when the tractor is stationary, and power lift connections extending from said power take-off device to said front and rear rock shafts.

33. In an agricultural implement the combination with a tractor including a motor, of an attachment comprising a front set of cultivating rigs connected with the front portion of the tractor, a front lifting member connected to raise and lower said rigs, a rear set of cultivating rigs connected with the rear portion of the tractor, a rear lifting member connected to raise and lower said latter rigs, a power lift crank on the tractor deriving power from the motor thereof, and operating connections extending from said crank to said front and rear lifting members, the rear connections being so arranged as to allow the rear lifting member to be actuated independently of the power lift crank, and means to independently actuate the rear lifting member.

34. An agricultural implement comprising the combination with a tractor having a motor, rear cultivator rigs pivoted to the rear part of the tractor, a rear rock shaft journaled on the tractor and having arms connected to the rigs to lift the same when the shaft is rocked, means including a member having an abutment near one end and slidably connected with the shaft to rock the same when actuated in one direction, said means adapted to be operated from the motor, and manually operated means to actuate the shaft independently of the power operated member.

35. An agricultural implement comprising the combination with a tractor having a motor, front cultivator rigs connected to the tractor, lifting connections therefor adapted to be actuated by the motor, rear cultivator rigs pivoted to the rear part of the tractor, a rear rock shaft journaled on the tractor and having arms connected to the rigs to lift the same when the shaft is rocked, a sleeve member connected with the shaft, a rod slidable in the sleeve and having an abutment near one end to contact with the sleeve whereby to rock the shaft when the rod is actuated in one direction, said rod including connections adapted to be actuated by the motor, and manually operated means to rock the shaft independently of the power operated rod including a part contacting with the sleeve member to rock the shaft, the sleeve member sliding forward on the rod.

36. In an agricultural implement, the combination with a tractor, of cultivator rigs, a draft member rigidly connected to the tractor, means connecting the rigs to said member, a rig supporting member hinged to the tractor and supported at its outer end on a wheel, and means connecting said hinged member with said rigs.

37. In an agricultural implement, the combination with a tractor having front wheels and a motor, of cultivator rigs, a draft member rigidly connected to the tractor, means connecting the rigs to said member, a rig supporting member hinged to the tractor and supported at its outer end on a wheel, and means including a power actuated member connecting said hinged member with said rigs, whereby draft is applied to said rigs through said rigid member and said hinged member controls the depth of the rigs, said rigs being substantially in the plane of said front wheels transversely of the tractor.

38. In an agricultural implement, the combination with a tractor having a motor, of cultivator rigs, a draft member rigidly connected to and extending laterally from the side of the tractor, means pivotally connecting the rigs to said draft member to extend forwardly thereof, a supporting member for the rigs hinged to the tractor over the rigs and extending substantially parallel to and beyond said draft member and being adjustably mounted at its outer end on a wheel, power actuated means including a rock shaft mounted for movement on said hinged member and deriving power from the motor, and adjustable mechanism connecting said shaft with each rig, whereby draft is applied to the rigs through said rigid member and the depth of the rigs is controlled by said hinged member and each rig is individually adjustable relative to the hinged member.

39. In an agricultural implement, the combination with a tractor having a motor, of front and rear implement devices mounted at the front and rear ends of the tractor, power lifting connections for both front and rear devices adapted to be actuated by the motor, manually operable means for lifting the rear implement devices independently of said power connections, and manually operable means for controlling the front implement devices independently of the power connections, said last named manually operable means being also effective for transmitting power lift energy to the front devices.

40. In an agricultural implement, the combination with a tractor having front wheels and a motor, of front and rear implement means mounted at the front and rear ends of the tractor and comprising devices adapted to be raised and lowered in the operation of the implement, power lift means on the tractor deriving power from the motor, operating connections extending from said power lift means to the front and rear devices including manually operable lifting means for raising and lowering the rear implement means independently of the power operated connections and manually operable depth adjusting means for adjusting the front implement devices independently of the power operated connections, whereby, depending upon the position of the manually operable lifting means for the rear implement devices, the power lift means can raise the front implement devices without raising the rear devices or both front and rear implement devices can be raised by the power lift means at the same time.

41. In an agricultural implement, the combination with a tractor having front wheels and a motor, of front and rear implement means mounted at the front and rear ends of the tractor and comprising devices adapted to be raised and lowered in the operation of the implement, power lift means on the tractor deriving power from the motor, operating connections extending from said power lift means to the front and rear devices including individually manually operable depth adjusting means for adjusting each of said front implement devices independently of the power operated connections, manually operable lifting means for raising and lowering the rear implement means independently of the power operated connections, and manually operable depth adjusting means for adjusting all of the front implement devices independently of the power operated connections, whereby, dependent upon the position of the manually operable lifting means for the rear implement devices, the power lift means can raise the front implement devices only or both front and rear devices can be so raised at the same time, said front implement means being substantially in the lateral plane of the front wheels of the tractor relative to the tractor.

42. An agricultural implement comprising the combination with a tractor including front and rear wheels, of a transverse draft member connected with the tractor, soil engaging devices connected with the draft member, supporting means for said devices including a transverse bar secured to the tractor forward of said member and connected with the soil engaging devices, and means carried by said bar operative to control the position of said soil engaging devices.

43. An agricultural implement comprising the combination with a tractor including front and rear wheels, of a transverse draft member rigidly connected with the tractor, soil engaging devices connected with the draft member, connecting means for adjustably securing said devices to the draft member in laterally adjusted position, and supporting means for said devices including a transverse bar secured to the tractor forward of said member and connected with the soil engaging devices.

44. An agricultural implement comprising the combination with a tractor including front and rear wheels, of a transverse draft member connected with the tractor, soil engaging devices connected with the draft member, supporting means for said devices including a transverse rock shaft secured to the tractor forward of said member and connected with the soil engaging devices, and means mounting said rock shaft on the tractor.

45. An agricultural implement comprising the combination with a tractor including front and rear wheels, of a transverse draft member connected to the tractor intermediate said wheels and extending laterally beyond the wheels, soil engaging devices connected at their rear ends to the draft member, and laterally extending rock shaft means having journal support on the tractor forward of the draft member for controlling the position of said soil engaging devices.

46. An agricultural implement comprising the combination with a tractor including a motor, of a laterally extending draft beam, soil engaging devices connected with the beam, other soil engaging devices connected with the tractor, a wheel supported bar hingedly connected with the tractor for supporting the first named soil engaging devices, and connections carried by said bar and associated with said second named devices for raising all of said soil engaging devices.

47. An agricultural implement comprising the combination with a tractor having a motor, of a laterally extending draft beam, a plurality of soil engaging rigs connected at their rear ends with the beam and extending forwardly therefrom, and means actuated by the motor for controlling the position of said rigs, said means comprising a plurality of interconnected rock shaft sections journaled for rocking movement on the tractor.

48. A cultivator comprising a wheeled frame, a laterally extending rigid draft member, cultivator beams pivoted thereto for swinging movement in a vertical plane about the axis of said member and extending forwardly thereof, soil tilling tools connected to the beams forwardly of the member, and means including a transverse member journaled on the frame for controlling the vertical position of the beams.

49. A cultivator comprising a wheeled frame, a laterally extending rigid draft member, cultivator beams connected therewith and extending forwardly thereof, soil tilling tools connected with the beams forwardly of the member, and means flexible with respect to the wheeled frame for controlling the position of the beams including a ground engaging support for said flexible means and means carried thereby for raising and lowering said rigs.

50. An agricultural implement comprising the combination with a tractor having a motor, a rigid laterally extending draft bar connected to the tractor intermediate the ends thereof, a plurality of cultivator rigs pivoted to said draft bar, and flexible means for supporting the cultivator rigs, including a wheel supported transverse bar hingedly connected with the tractor and an adjustable connection between said bar and certain of said rigs.

51. In an agricultural implement, the combination with a tractor having front and rear wheels and a motor, of a transversely disposed draft member rigidly connected with the tractor, cultivator rigs pivotally connected with said draft member, a transversely disposed rig supporting member hinged to the tractor and supported at its outer end on a wheel, and a transverse rig lifting member supported by said hinged member and adapted to be actuated to raise or lower the rigs with respect to said hinged member.

52. In an agricultural implement, the combination with a tractor having front and rear wheels and a motor, of a transversely disposed draft member rigidly connected with the tractor, cultivator rigs pivotally connected with said draft member and extending forwardly therefrom, a transversely disposed rig supporting member hingedly connected with the tractor and supported at its outer end on a wheel, said rig supporting member being mounted forward of said transverse draft member, and a transverse rig lifting member supported by said hinged member and adapted to be actuated to raise or lower the rigs with respect to said hinged member.

53. In an agricultural implement, the combination with a tractor having a motor, of an earth working tool carrying rig connected with the tractor to be lifted or lowered, rig lifting means on the tractor connected with the rig, for lifting the same by actuation of said lifting means, and means for actuating said lifting means to lift the rig, comprising power lift mechanism actuated by power from said motor, an actuating connection between said power lift mechanism and said rig lifting means, a manually operable lever, and an actuating connection between said lever and said rig lifting means, said connections being operable separately, and independently of each other, by said power lift mechanism, and by said lever, respectively, to actuate said rig lifting means to lift the rig, whereby the rig may be lifted either by said power lift mechanism, or manually by said lever, operating independently of each other.

54. In an agricultural implement, the combination with a tractor having a motor, of an earth working tool carrying rig connected with the tractor to be lifted or lowered, rig lifting means on the tractor connected with the rig, for lifting the same by actuation of said lifting means, means for actuating said lifting means to lift the rig, comprising power lift mechanism actuated by power from said motor, an actuating connection between said power lift mechanism and said rig lifting means, a manually operable lever, and an actuating connection between said lever and said rig lifting means, said connections being operable separately, and independently of each other, by said power lift mechanism, and by said lever, respectively, to actuate said rig lifting means to lift the rig, whereby the rig may be lifted either by said power lifting mechanism, or manually by said lever, operating independently of each other, and locking means associated with said lever for locking it in different positions to limit the downward movement of the rig.

55. In an agricultural implement, the combination with a tractor having a motor, of an earth working tool carrying rig connected with the tractor to be lifted or lowered, a rocking rig lifting member on the tractor connected with the rig to lift or lower the rig by the rocking of said member, and means for rocking said member to lift the rig, comprising power lift mechanism actuated by power from said motor, a connection between said power lift mechanism and said rocking member operable to rock said member to lift the rig, said rocking member being movable to lift the rig independently of actuation of said connection, a manually operable lever, and a connection operable by said lever to rock said member to lift the rig, said rocking member being movable to lift the rig independently of actuation of the latter connection, whereby the rig may be lifted either by said power lift mechanism, or manually by said lever, operating independently of each other.

In witness whereof, I hereunto subscribe my name this 2d day of May, 1930.

THEOPHILUS BROWN.